Feb. 17, 1925.
E. I. LINDBERG
FISH LURE
Filed Feb. 12, 1924
1,526,713
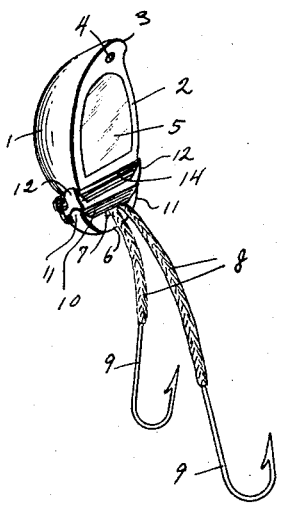
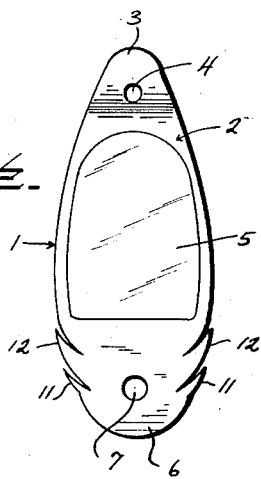
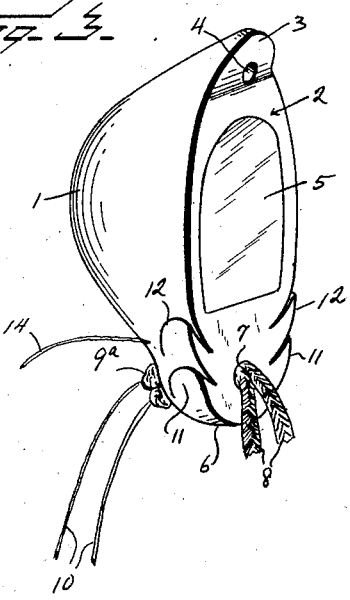
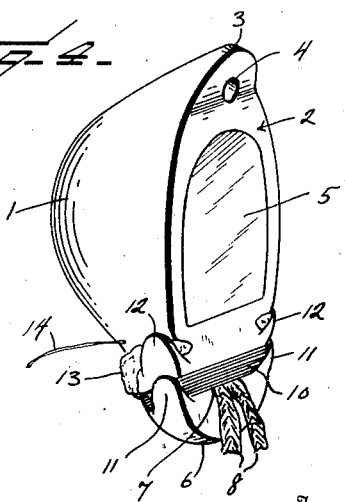
Inventor
E. I. Lindberg
By Watson E. Coleman
Attorney Patented Feb. 17, 1925.

1,526,713

UNITED STATES PATENT OFFICE.

EMIL I. LINDBERG, OF GACKLE, NORTH DAKOTA.

FISH LURE.

Application filed February 12, 1924. Serial No. 692,359.

*To all whom it may concern:*

Be it known that I, EMIL I. LINDBERG, a citizen of Finland, residing at Gackle, in the county of Logan and State of North Dakota, have invented certain new and useful Improvements in Fish Lures, of which the following is a specification, reference being had to the accompanying drawings.

This invention relates to an improved lure for use in fishing and one object of the invention is to provide a device of this character which may serve as means for attracting the fish and also as a sinker and further serve as means for carrying the hooks upon which the bait is to be placed.

Another object of the invention is to provide a lure in which the leaders from the hooks and a piece of mirror or other reflecting substance may be firmly embedded in the sinker forming portion of the device so that when the device is in use the fish may be attracted towards the bait upon the hooks by the mirror and caused to very readily find the bait.

Another object of the invention is to so construct the sinker portion of this device that a piece of colored material such as red cord may be wrapped about the end adjacent the mirror and adjacent the point where the leaders of the hooks are connected with the sinker and serve as means for attracting the fish.

Another object of the invention is to so construct the sinker portion that when in use it may be dragged along the bottom of the river or other body of water and not be liable to catch in rocks.

This invention is illustrated in the accompanying drawings, wherein:—

Figure 1 is a perspective view of the fish lure.

Figure 2 is a top plan view of the sinker forming body portion.

Figure 3 is a perspective view showing the body portion with the hook leaders passed through it.

Figure 4 is a view similar to Figure 3 showing the stringers of the leaders wrapped about the body and the fish attracting yarn in place.

This improved fish lure is for use in connection with hand lines when trolling or casting and also for still fishing. The body portion 1, which constitutes the sinker, is formed preferably of lead and is provided with a flat upper face 2 which at one end tapers into an upwardly and forwardly projecting nose 3 having an opening 4 formed therein so that the sinker may be connected with the fishing line. A reflector plate 5 which is preferably in the form of a small piece of mirror is embedded in the upper face of the lead body and may be put in place when the body is moulded or this body moulded with the recess formed in it so that the mirror can be set in the recess and the soft lead from which the sinker is formed forced into position to retain the mirror in place.

The rear end portion of the sinker body is provided with a shoulder extension 6 having an opening 7 formed therein through which will be passed the leaders 8 carrying the hooks 9. After the leaders have been passed through the opening 7 knots will be formed, as shown at 9ª to prevent the leaders from being withdrawn from the opening 7. When the knots 9ª are formed ends will be left extending from the leaders and these ends 10 will be wrapped about this shoulder extension 6 and firmly held in place by tongues 11 cut from the sides of the shoulder and bent over the ends 10 to firmly clamp them against unwinding from the shoulder. Additional tongues 12 are cut from the sides of the shoulder and a piece of yarn or fabric 13 which is preferably red but which may be some other suitable bright color, is placed across the under portion of this shoulder with its ends extending beneath the tongues. A string 14 which is also preferably red but which will, of course, be the same color as the yarn or piece of fabric 13, is then wrapped about this piece of yarn and about the shoulder 6 and passed beneath the tongues 12. After the thread or string 14 has been wrapped about the shoulder a sufficient number of times the tongues will be pressed back into close engagement with the sides of the shoulder and the yarn and thread will be securely held in place. It will therefore be seen that with this construction the leaders of the hooks and the colored fabric, which is to serve as fish attracting means, will be securely held in engagement with the rear end portion of the sinker.

When this device is in use the fish line will be passed through the opening 4 and formed into a suitable knot to retain the sinker in engagement with the fishing line. The bait will be placed on the hooks 9 and the device is then ready for use. When a cast is made the sinker carries the line down to the bottom of the river and the mirror or reflector 5 and red fabric will serve as means to attract fish at some distance so that the fish will move towards the lure to investigate it. They will then attempt to take the minnows or other bait carried by the hooks 9 and will be caught in the usual manner. By having the sinker deep in the intermediate portion and rounded at the bottom and sloping upwardly towards the front end, the sinker will be so shaped that when dragged along the bottom of the river or lake it will not be liable to catch in stones or other obstructions and cause the line to be broken in attempting to free the sinker. There has, therefore, been provided a combination sinker and fish lure which will serve very effectively to attract the fish and which will further be so formed that it can be used without the sinker being liable to catch in obstructions.

What is claimed is:—

1. In a fish lure, a sinker body having a rear extension formed with a plurality of forwardly extending inclined bendable tongues and formed with a hole, a hook having a leader engaged through the hole and wrapped about the extension beneath certain of the tongues whereby to be clamped upon bending of the tongues, and a strand of bright colored material wrapped about the extension and clamped beneath certain other of the tongues.

2. In a fish lure, a sinker body having a rear extension formed with forward inclined bendable tongues and formed with a hole, hooks having leaders passed through said hole and knotted, the ends of the leaders beyond the knot being wrapped about the extension beneath the tongues whereby to be clamped upon bending of the tongues.

3. A fish lure comprising a body forming a sinker and having a tapered forward end portion and a rear extension forming a shoulder, the shoulder being cut rearwardly to provide forwardly extending tongues, and a hook having a leader passing through an opening in the rear end portion of the sinker and wrapped about the rearwardly extending shoulder with portions of the leader passing beneath the tongues, the tongues being moved into tight binding engagement with the portions of the leader positioned beneath the tongues.

4. A fish lure comprising a sinker having a flat upper face and a rounded bottom, the sinker being tapered forwardly and having a rearwardly extending shoulder portion provided with side tongues and an opening, a reflector imbedded in the upper face of the sinker, a hook having a leader extending through the opening in the rear portion of the sinker and wrapped about the shoulder beneath certain of the tongues, and a strand of colored material wrapped about the shoulder and passing beneath other tongues, the tongues being pressed into close binding engagement with the strand and stringers of the leader to securely hold the same in place.

In testimony whereof I hereunto affix my signature.

EMIL I. LINDBERG.